United States Patent
Li et al.

(10) Patent No.: US 11,837,252 B2
(45) Date of Patent: Dec. 5, 2023

(54) SPEECH EMOTION RECOGNITION METHOD AND SYSTEM BASED ON FUSED POPULATION INFORMATION

(71) Applicant: Zhejiang Lab, Zhejiang (CN)

(72) Inventors: Taihao Li, Zhejiang (CN); Shukai Zheng, Zhejiang (CN); Yulong Liu, Zhejiang (CN); Guanxiong Pei, Zhejiang (CN); Shijie Ma, Zhejiang (CN)

(73) Assignee: Zhejiang Lab, Zhejiang (CN)

( * ) Notice: Subject to any disclaimer, the term of this patent is extended or adjusted under 35 U.S.C. 154(b) by 0 days.

(21) Appl. No.: 17/845,908

(22) Filed: Jun. 21, 2022

(65) Prior Publication Data

US 2022/0328065 A1 Oct. 13, 2022

Related U.S. Application Data

(63) Continuation of application No. PCT/CN2022/070728, filed on Jan. 7, 2022.

(30) Foreign Application Priority Data

Mar. 26, 2021 (CN) .......................... 202110322720.X

(51) Int. Cl.
*G10L 25/63* (2013.01)
*G10L 25/18* (2013.01)
(Continued)

(52) U.S. Cl.
CPC .............. *G10L 25/63* (2013.01); *G10L 25/18* (2013.01); *G10L 25/21* (2013.01); *G10L 25/30* (2013.01)

(58) Field of Classification Search
CPC ......... G10L 25/63; G10L 25/18; G10L 25/21; G10L 25/30
See application file for complete search history.

(56) References Cited

U.S. PATENT DOCUMENTS

| 6,173,260 B1 | 1/2001 | Slaney |
| 10,937,446 B1 | 3/2021 | Wong et al. |

FOREIGN PATENT DOCUMENTS

| CN | 109935243 | 6/2019 |
| CN | 110021308 | 7/2019 |

(Continued)

OTHER PUBLICATIONS

Domnich, Artem, and Gholamreza Anbarjafari. "Responsible AI: Gender bias assessment in emotion recognition." arXiv preprint arXiv:2103.11436 (2021). (Year: 2021).*

(Continued)

*Primary Examiner* — Bhavesh M Mehta
*Assistant Examiner* — Edward Tracy, Jr.
(74) *Attorney, Agent, or Firm* — JCIPRNET

(57) ABSTRACT

The present invention discloses a speech emotion recognition method and system based on fused population information. The method includes the following steps: S1: acquiring a user's audio data; S2: preprocessing the audio data, and obtaining a Mel spectrogram feature; S3: cutting off a front mute segment and a rear mute segment of the Mel spectrogram feature; S4: obtaining population depth feature information through a population classification network; S5: obtaining Mel spectrogram depth feature information through a Mel spectrogram preprocessing network; S6: fusing the population depth feature information and the Mel spectrogram depth feature information through SENet to obtain fused information; and S7: obtaining an emotion recognition result from the fused information through a classification network.

4 Claims, 4 Drawing Sheets

(51) Int. Cl.
  *G10L 25/21* (2013.01)
  *G10L 25/30* (2013.01)

(56) References Cited

FOREIGN PATENT DOCUMENTS

| | | |
|---|---|---|
| CN | 110164476 | 8/2019 |
| CN | 110491416 | 11/2019 |
| CN | 112712824 | 4/2021 |

OTHER PUBLICATIONS

Zhang, Jianhua, et al. "Emotion recognition using multi-modal data and machine learning techniques: A tutorial and review." Information Fusion 59 (2020): 103-126. (Year: 2020).*

Yenigalla, Promod, et al. "Speech Emotion Recognition Using Spectrogram & Phoneme Embedding." Interspeech. vol. 2018. 2018. (Year: 2018).*

"International Search Report (Form PCT/ISA/210) of PCT/CN2022/070728", dated Mar. 30, 2022, pp. 1-5.

"Written Opinion of the International Searching Authority (Form PCT/ISA/237) of PCT/CN2022/070728", dated Mar. 30, 2022, pp. 1-5.

* cited by examiner

SPEECH EMOTION RECOGNITION METHOD AND SYSTEM BASED ON FUSED POPULATION INFORMATION

CROSS-REFERENCE TO RELATED APPLICATION

This application is a continuation of international PCT application serial no. PCT/CN2022/070728, filed on Jan. 7, 2022, which claims the priority benefit of China application no. 202110322720.X, filed on Mar. 26, 2021. The entirety of each of the above-mentioned patent applications is hereby incorporated by reference herein and made a part of this specification.

TECHNICAL FIELD

The present invention belongs to the technical field of artificial intelligence, and particularly relates to a speech emotion recognition method and system based on fused population information.

BACKGROUND

Language interaction is one of the earliest forms of human communication, and thus speech has become a main way for humans to express emotions. With the rise of human-computer interaction, intelligent speech emotion analysis becomes more and more important. At present, emotions are mainly classified into seven emotions proposed by Ekman in the last century, namely neutral, happy, sad, angry, fearful, disgusted, and surprised.

The current mainstream speech emotion recognition methods include machine learning methods based on traditional algorithms and deep learning methods based on a simple neural network architecture. A basic process based on the traditional machine learning method covers feature extraction of speech, and emotion classification of the speech according to the features. Wherein the features of speech usually include Mel frequency cepstral coefficients, Mel spectrogram, zero-crossing rate, fundamental frequency, etc. A basic process of methods based on deep learning is the same as that based on the traditional machine learning method, except that a traditional machine learning classifier uses SVM and other traditional algorithms, and the deep learning uses a neural network classifier. Currently, the features used by the deep learning methods include the Mel frequency cepstral coefficient and the Mel spectrogram, and the network is usually just a few layers of RNN or a few layers of CNN as a classifier.

In the current technology, because only the shallow information of speech is considered and a simple network structure is used, the emotion recognition has a low recognition rate and poor generalization.

SUMMARY

In order to solve the above-mentioned technical problems existing in the prior art, the present invention provides a method and system for effectively improving the accuracy of speech emotion recognition based on SENet fused population information and Mel spectrogram feature information. The specific technical solution is as follows:

A speech emotion recognition method and system based on fused population information includes the following steps:

S1: acquiring a user's audio data, expressed as $X_{audio}$, through a recording acquisition device;

S2: preprocessing the acquired audio data $X_{audio}$ to generate a Mel spectrogram feature, expressed as $X_{mel}$;

S3: calculating the energy of the Mel spectrogram in different time frames for the generated Mel spectrogram feature $X_{mel}$, cutting off a front mute segment and a rear mute segment by setting a threshold to obtain a Mel spectrogram feature, expressed as $X_{input}$, with a length of T;

S4: inputting the $X_{input}$ obtained in S3 into a population classification network to obtain population depth feature information $H_p$;

S5: inputting the $X_{input}$ obtained in S3 into a Mel spectrogram preprocessing network to obtain Mel spectrogram depth feature information $H_m$;

S6: fusing the population depth feature information $H_p$ extracted in S4 with the Mel spectrogram depth feature information $H_m$ extracted in S5 through a channel attention network SENet to obtain a fused feature $H_f$; and S7: inputting the fused feature $H_f$ in S6 into the population classification network through a pooling layer to perform emotion recognition.

Further, the population classification network is composed of a three-layer Long Short Term Memory (LSTM) network structure, and the S4 specifically includes the following steps:

S4_1: first, segmenting the inputted Mel spectrogram feature $X_{output}$ with the length of T into three Mel spectrogram segments $$\frac{T}{2}$$

in equal length in an overlapped manner, wherein the segmentation method is as follows: 0 to $$\frac{T}{2}$$

is segmented as a first segment, $$\frac{T}{4}$$

to $$\frac{3T}{4}$$

is segmented as a second segment, and $$\frac{T}{2}$$

to T is segmented as a third sections; and

S4_2: inputting the three Mel spectrogram segments segmented in S4_1 into the three-layer LSTM network in turn, then taking the last output from the LSTM network as a final state, obtaining three hidden features for the three Mel spectrogram segments at last, and finally averaging the three hidden features to obtain the final population feature information $H_p$.

Further, the Mel spectrogram preprocessing network in the S5 is composed of a ResNet network and an feature map scaling (FMS) network which are cascaded, and the S5 specifically includes the following steps: first, expanding the Mel spectrogram feature $X_{input}$ with the length of T into a 3D matrix; second, extracting the emotion-related information from the Mel spectrogram feature $X_{input}$ by using the ResNet network structure and adopting a two-layer convolution and maximum pooling structure; and third, effectively combining the information extracted by the ResNet network through an FMS network architecture to finally obtain the Mel spectrogram depth feature information $H_m$.

Further, the S6 specifically includes the following steps:

S6_1: the information feature information $H_p$ is a 1D vector in space $R^C$, where C represents a channel dimension; the Mel spectrogram depth feature information $H_m$ is a 3D matrix in space $R^{T \times W \times C}$, where T represents a time dimension, W represents a width dimension, and C represents a channel dimension; performing global average pooling on the $H_m$ in the time dimension T and the width dimension W through the SENet network, converting the $H_m$ into a C-dimensional vector to obtain the 1D vector $H_{p\_avg}$ in space $R^C$; specifically, $$H_m = [H^1, H^2, H^3, \ldots, H^C]$$

where, $$H^c = [[h_{1,1}^c, h_{2,1}^c, h_{3,1}^c, \ldots, h_{T,1}^c]^T, [h_{1,2}^c, h_{2,2}^c, h_{3,2}^c, \ldots, h_{T,2}^c]^T, \ldots, [h_{1,W}^c, h_{2,W}^c, h_{3,W}^c, \ldots, h_{T,W}^c]^T]$$

in addition, $$H_{p\_avg} = [h_{p\_avg}^1, h_{p\_avg}^2, h_{p\_avg}^3, \ldots, h_{p\_avg}^C]$$

a formula of the global average pooling is as follows:

$$h_{p\_avg}^c = \frac{1}{TW} \sum_{i=1, j=1}^{T,W} h_{ij}^c$$

S6_2: Splicing the $H_{p\_avg}$ obtained in S6_1 with the population depth feature information $H_p$ to obtain a spliced feature $H_c$, expressed as:

$$H_c = [H_{p\_avg}, H_p]$$

S6_3: inputting the spliced feature $H_c$ obtained in S6_2 into a two-layer fully-connected network to obtain a channel weight vector $W_c$, where a calculation formula of the fully-connected network is as follows:

$$Y = W*X + b$$

where Y represents an output of the network, X represents an input of the network, W represents a weighting parameter of the network, and b represents a bias parameter of the network; and S6_4: multiplying the weighting parameter obtained in S6_3 by the Mel spectrogram depth feature information $H_m$ obtained in S5 to obtain an emotion feature matrix, and performing global average pooling on the emotion feature matrix in the dimension T×W to obtain a fused feature $H_f$.

Further, the S7 specifically includes the following steps:

S7_1: after passing through the pooling layer, inputting the $H_f$ obtained in S6 into the two-layer fully-connected network to obtain a 7-dimensional feature vector $H_b$, where 7 represents a number of all emotion categories; and S7_2: taking the feature vector $H_b = [h_b^1, h_b^2, h_b^3, h_b^4, h_b^5, h_b^6, h_b^7]$ obtained in S7_1 as an independent variable of a Softmax operator, calculating a final value of Softmax as a probability value of an inputted audio belonging to each emotion category, and finally selecting the category with the maximum probability value as a final audio emotion category, wherein a calculation formula of the Softmax is as follows:

$$p^i = \frac{e^{h_b^i}}{\sum_{n=1}^{7} e^{h_b^n}}$$

where e is a constant.

A speech emotion recognition system based on fused population information includes: a speech signal acquisition module, configured to acquire a user's speech signal; a speech signal preprocessing module, configured to preprocess the acquired speech signal, perform endpoint detection on the speech, remove a front mute segment and a rear mute segment of the speech, and generate data that can be used for neural network processing; an emotion prediction module, configured to process Mel spectrogram features through a designed network model to predict an emotion category of the user's audio; and a data storage module, configured to store user's speech data and emotional label data in a MySQL database.

Further, the speech signal acquisition module adopts a high-fidelity single microphone or a microphone array.

Further, the preprocessing includes: converting a speech signal from a time-domain signal to a frequency-domain signal (that is, converting from an audio sample into Mel spectrogram features) through operations of pre-emphasis, framing, windowing, short-time Fourier transform, trigonometric filtering and mute segment removal; wherein the speech is muted and denoised by spectral subtraction, the speech is pre-emphasized by a Z transform method, and the Mel spectrogram features are extracted from the speech by the short-time Fourier transform method.

The present invention has the following advantages:

1. In the speech emotion recognition method of the present invention, speech emotion is recognized based on fused population information. Differences in the physiological development of different populations result in different the morphological structures in the vocal cord, thereby affecting the effect of people's pronunciation, for example, children's pronunciation is crisp and sharp, the voice of the elderly is muddy and deep, and the voice of an adult man is usually lower and deeper than that of an adult woman. Therefore, the fusion of population information can more effectively extract the emotional information contained in speech.
2. The speech emotion recognition method of the present invention uses LSTM to take the last output and uses the global pooling technology, so that the limitation of speech length can be ignored to realize the emotion recognition of speeches of different lengths.
3. The speech emotion recognition method of the present invention uses SENet for information fusion, so that important information in the network can be effectively extracted through the channel attention mechanism of SENet, thereby improving the overall accuracy of the model.

4. The speech emotion recognition system of the present invention has the function of storing the results of emotion analysis and original conversational speech, which can help to make reasonable analysis and suggestions, for example, the method can be used for scenarios of evaluation on the service quality of intelligent phone customer service, scenarios of user satisfaction analysis of intelligent speech robots, scenarios of voice message emotion analysis, scenarios of voice emotion category analysis in videos, etc.

DETAILED DESCRIPTION OF THE EMBODIMENTS

In order to make the objectives, technical solutions and technical effects of the present invention more clearly, the present invention will be further explained in detail below in combination with the accompanying drawings of the specification.

Figure 1:
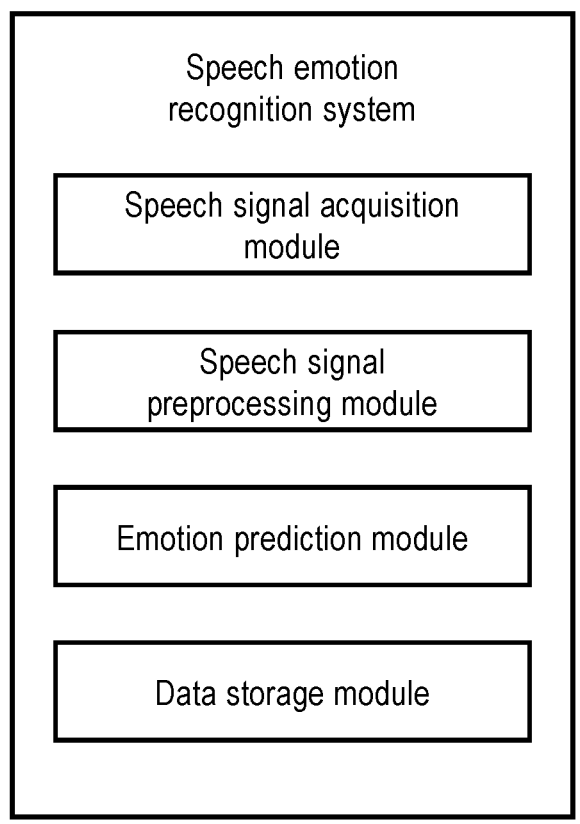
FIG. 1 is a structural chart of a speech emotion recognition system of the present invention.

As shown in FIG. 1, a speech emotion recognition system based on fused population information includes:

a speech signal acquisition module, configured to acquire a user's speech signal; usually a high-fidelity single microphone or a microphone array is adopted to reduce the degree of distortion in speech signal acquisition;

a speech signal preprocessing module, configured to preprocess the acquired speech signal, perform endpoint detection on the speech, remove a front mute segment and a rear mute segment of the speech, and generate data that can be used for neural network; specifically, the module converts a speech signal from a time-domain signal to a frequency-domain signal (that is, converting the speech signal from an audio sample into Mel spectrogram features) for subsequent processing through operations of pre-emphasis, framing, windowing, short-time Fourier transform, trigonometric filtering and mute segment removal for the speech; wherein the speech is denoised by spectral subtraction, the speech is pre-emphasized by a Z transform method, and the Mel spectrogram features are extracted from the speech by the short-time Fourier transform method;

an emotion prediction module, configured to process Mel spectrogram features through a designed network model to predict an emotion category of the user's audio; and a data storage module, configured to store user's speech data and emotional label data in MySQL and other databases.

Figure 2:
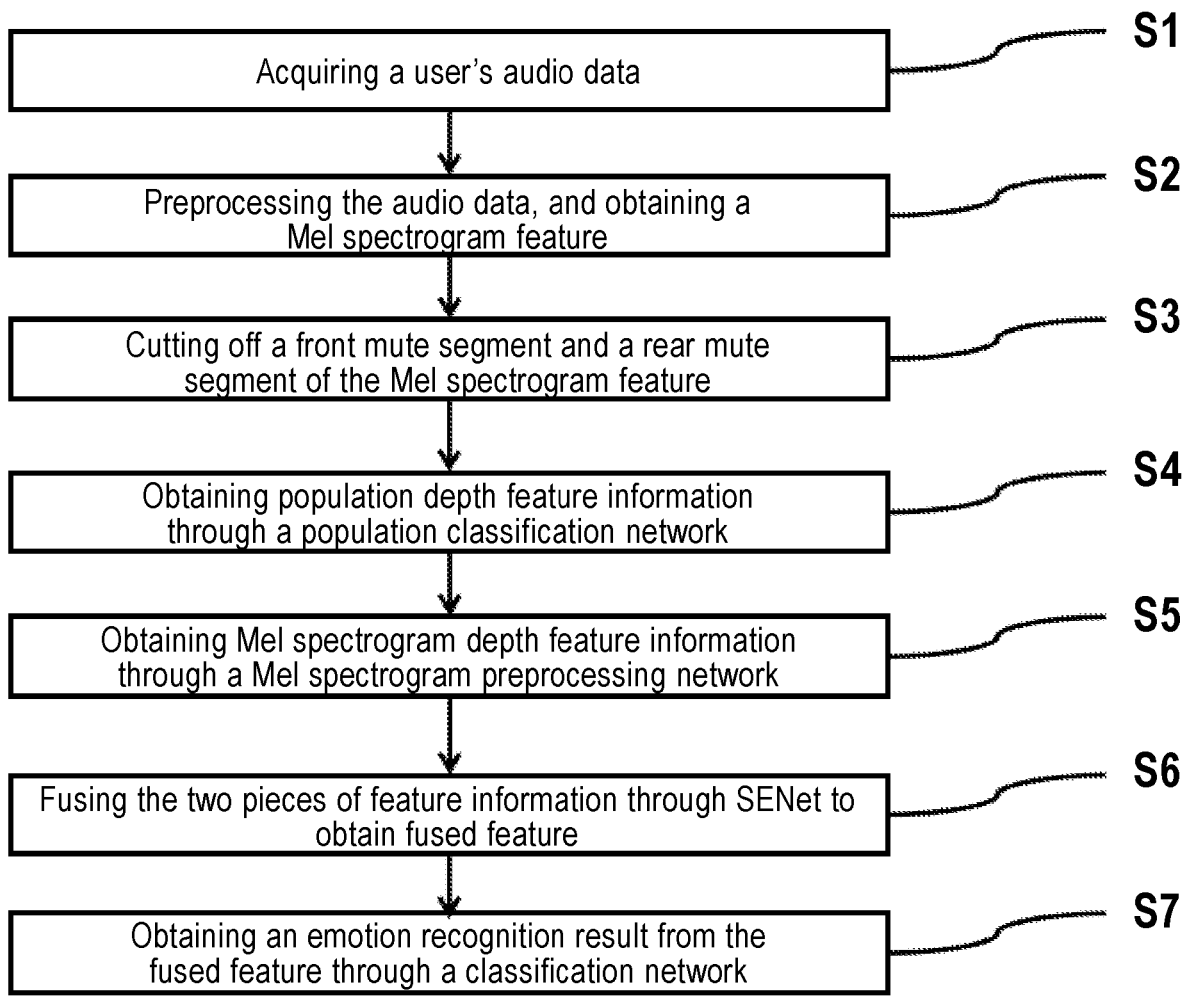
FIG. 2 is a flow chart of a speech emotion recognition method of the present invention.

As shown in FIG. 2, a speech emotion recognition method based on fused population information includes the following steps:

S1: a user's audio data, expressed as $X_{audio}$, is acquired through a recording acquisition device.

S2: the acquired audio data $X_{audio}$ is preprocessed by pre-emphasis and short-time Fourier transform to generate a Mel spectrogram feature, expressed as $X_{mel}$, wherein Mel spectrogram is a matrix in a dimension of T'×128.

S3: the energy of the Mel spectrogram in different time frames is calculated for the generated Mel spectrogram feature $X_{mel}$, a front mute segment and a rear mute segment are cut off by setting a threshold to obtain a Mel spectrogram feature, expressed as $X_{input}$, with the network input in a dimension of T×128.

Wherein the step of cutting off a front mute segment and a rear mute segment realizes the removal of a mute frame by the following steps: adding up the energy of the Mel spectrogram in different frequency dimensions of various frames, setting a threshold, and removing the frames lower than the threshold.

S4: the $X_{input}$ obtained in S3 is inputted into a population classification network to obtain population depth feature information $H_p$; the population classification network is composed of a three-layer LSTM network structure, the LSTM network is a recurrent neural network structure that can effectively solve the problem of long sequence dependence, and multi-layer LSTM is often used to solve the problem of sequence dependence such as speech. S4 specifically includes the following steps:

S4_1: first, segmenting the inputted Mel spectrogram feature with the length of T into three Mel spectrogram segments $$\frac{T}{2}$$

in equal length in an overlapped manner, wherein the segmentation method is as follows: 0 to $$\frac{T}{2}$$

is segmented as a first segment, $$\frac{T}{4}$$

to $$\frac{3T}{4}$$

is segmented as a second segment, and $$\frac{T}{2}$$

to T is segmented as a third sections; and

S4_2: inputting the three Mel spectrogram segments segmented in S4_1 into the three-layer LSTM network in turn, and then taking the last output from the LSTM network as a final state. Through this method, three hidden features in a dimension of 256 are obtained for the three Mel spectrogram segments at last, and finally the three hidden features are averaged as the final population feature information $H_p$. The three-layer LSTM can effectively extract the information of long-lived sequence such as the Mel spectrogram; the text content and other information unrelated to the population information in the Mel spectrogram can be effectively removed by taking the last state of LSTM and averaging, so that the accuracy of population information extraction can be improved.

S5: the $X_{input}$ obtained in S3 is inputted into a Mel spectrogram preprocessing network to obtain Mel spectrogram depth feature information $H_m$.

Figure 4:
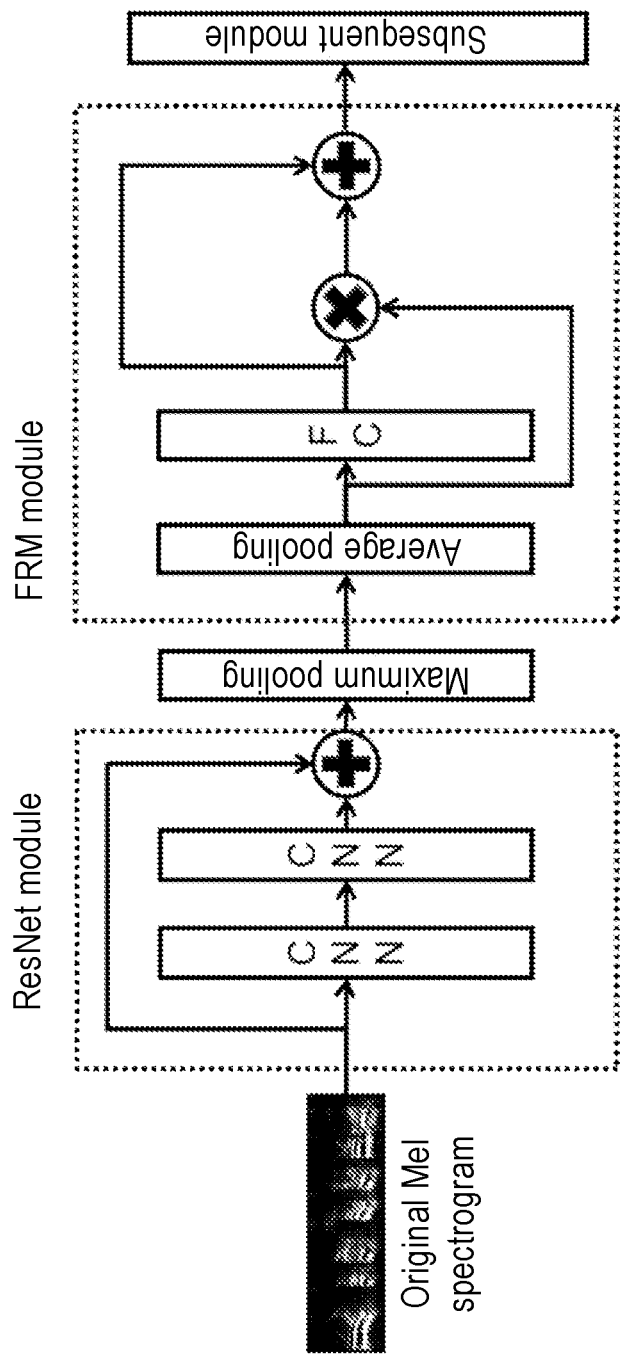
FIG. 4 is a network structure diagram of the fusion of ResNet and FMS.

The Mel spectrogram preprocessing network is composed of a ResNet network and an FMS network which are cascaded, and the specific network structure is as shown in FIG. 4. The Mel spectrogram preprocessing network has the following processing steps: first, expanding the Mel spectrogram in a dimension of T×128 into a 3D matrix of T×128×1, performing depth information processing of Mel spectrogram features through the ResNet and FMS network structure, and generate depth Mel spectrogram features in a dimension of T×128×256; second, extracting emotion-related information from the Mel spectrogram by using the ResNet network structure and adopting a two-layer convolution and maximum pooling structure; and third, effectively combining the information extracted by the ResNet network through an FMS network architecture to obtain more reasonable emotion related features.

The ResNet network can expand the network depth and improve the network learning ability, and meanwhile, it can solve the problem of gradient disappearance in deep learning; the FMS network can effectively extract information from the network, which helps the ResNet network to efficiently extract useful information from the network.

Figure 3:
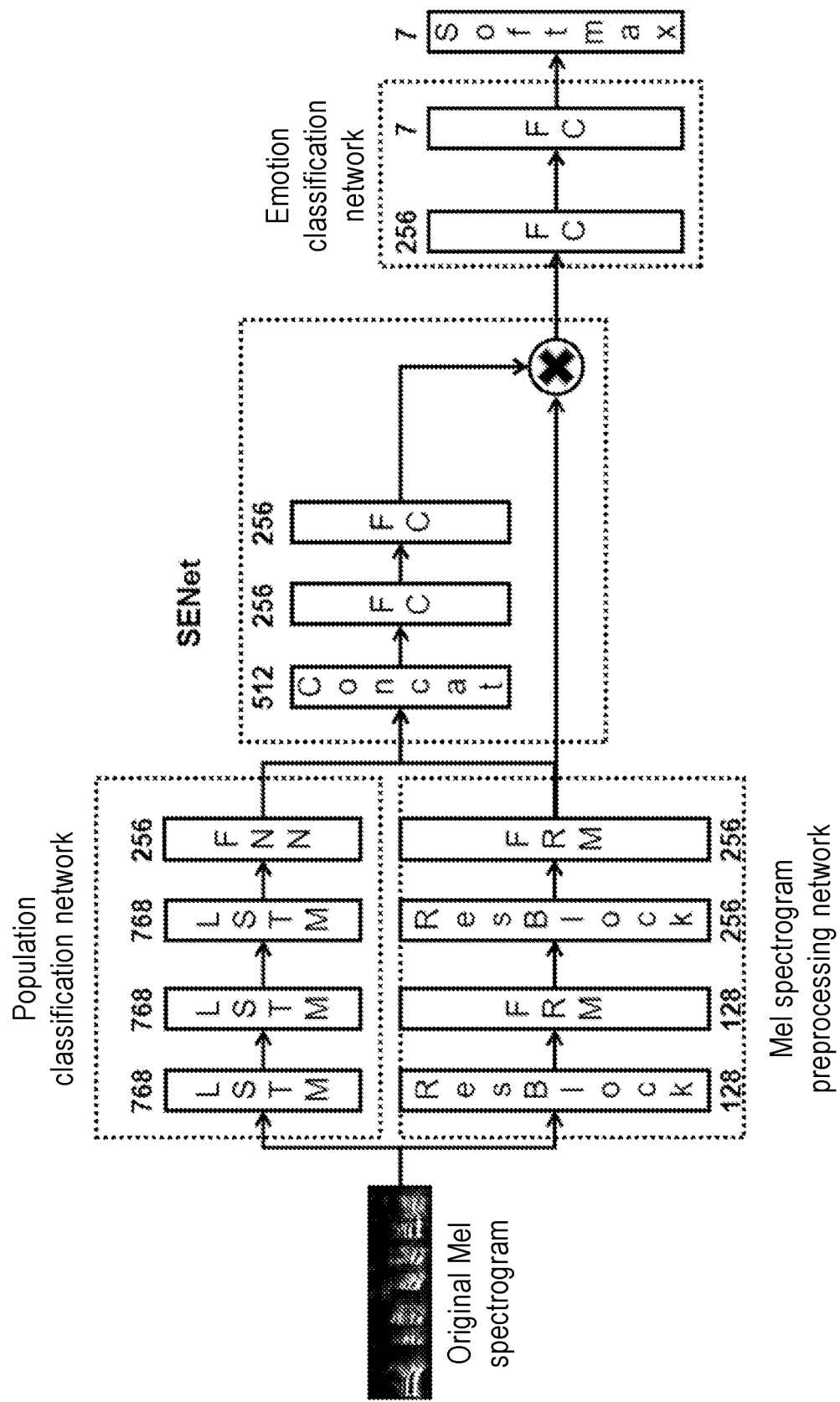
FIG. 3 is a network structure diagram of a speech emotion recognition method of the present invention.

S6: the population depth feature information $H_p$ extracted in S4 is fused with the Mel spectrogram depth feature information $H_m$ extracted in S5 through a channel attention network SENet, as shown in FIG. 3, to obtain a fused feature $H_f$, including the following specific steps:

S6_1: the information feature information $H_p$ obtained in S4 is a 1D vector in space $R^C$, where C represents a channel dimension; the Mel spectrogram depth feature information $H_m$ obtained in S5 is a 3D matrix in space $R^{T \times W \times C}$, where T represents a time dimension, W represents a width dimension, and C represents a channel dimension; performing global average pooling on the $H_m$ in the time dimension T and the width dimension W through the SENet network, converting the $H_m$ into a C-dimensional vector to obtain the 1D vector $H_{p\_avg}$ in space $R^C$; specifically, $$H_m = [H^1, H^2, H^3, \ldots, H^C]$$

where, $$H^c = \lfloor [h_{1,1}^c, h_{2,1}^c, h_{3,1}^c, \ldots h_{T,1}^c,]^T, [h_{1,2}^c, h_{2,2}^c, h_{3,2}^c, \ldots, h_{T,2}^c,]^T, \ldots, [h_{1,W}^c, h_{2,W}^c, h_{3,W}^c, \ldots, h_{T,W}^c,]^T \rfloor$$

The feature after the average pooling is as follows:

$$H_{p\_avg} = [h_{p\_avg}^1, h_{p\_avg}^2, h_{p\_avg}^3, \ldots, h_{p\_avg}^C]$$

a formula of the global average pooling is as follows:

$$h_{p\_avg}^c = \frac{1}{TW} \sum_{i=1, j=1}^{T,W} h_{ij}^c$$

S6_2: splicing the $H_{p\_avg}$ obtained in S6_1 with the population depth feature information $H_p$ to obtain a spliced feature $H_c$, expressed as:

$$H_c = \lfloor H_{p\_avg}, H_p \rfloor$$

S6_3: inputting the spliced feature $H_c$ obtained in S6_2 into a two-layer fully-connected network to obtain a channel weight vector $W_c$. Specifically, a calculation formula of the fully-connected network is as follows:

$$Y = W*X + b$$

where Y represents an output of the network, X represents an input of the network, W represents a weighting parameter of the network, and b represents a bias parameter of the network; and S6_4: multiplying the weighting parameter obtained in S6_3 by the Mel spectrogram depth feature information $H_m$ obtained in S5 to obtain a fused feature $H_f$;

The SENet automatically calculates the weighting coefficient of each channel through the network, so that the important information extracted from the network can be effectively enhanced, and meanwhile, the weight of useless information can be reduced. In addition, the SENet in which the population information is added can emphasize on extracting information related to the pronunciation characteristics of the population according to different populations, and further improve the accuracy of emotion recognition.

S7: the fused feature $H_f$ in S6 is inputted into the population classification network through a pooling layer to perform emotion recognition; that is, the 3D matrix of T×128×256 is converted into a 256-dimensional 1D vector and then inputted to the classification network for emotion recognition; the classification network is composed of a layer of 256-dimensional fully-connected network and a layer of 7-dimensional fully-connected network; finally, probabilities of seven emotion categories are calculated for the outputted 7-dimensional feature through a Softmax operator, and the one with the maximum probability is the final emotion category, specifically including the following steps:

S7_1: after passing through the pooling layer, inputting the $H_f$ obtained in S6 into the two-layer fully-connected network to obtain a 7-dimensional feature vector $H_b$, where 7 represents a number of all emotion categories; and S7_2: taking the feature vector $H_b = [h_b^1, h_b^2, h_b^3, h_b^4, h_b^5, h_b^6, h_b^7]$ obtained in S7_1 as an independent variable of the Softmax operator, calculating a final value of the Softmax as a probability value of an inputted audio belonging to each emotion category, and finally selecting the category with the maximum probability value as a final audio emotion category, wherein a calculation formula of the Softmax is as follows:

$$p^i = \frac{e^{h_b^i}}{\sum_{n=1}^{7} e^{h_b^n}}$$

where e is a constant.

In conclusion, the method provided by the embodiment increases the accuracy of extracting audio emotion features based on fused population information, so that it can increase the emotion recognition ability of an entire model.

Those mentioned above are only the preferred embodiments of the present invention, rather than limiting the present invention in any form. Although the implementation process of present application has been explained in detail in the preceding text, for those of skilled in the art, the technical solutions recorded in the above-mentioned embodiments can be modified, or a part of the technical features can be equivalently alternated. Any modification or equivalent alternation within the spirit and principle of the present invention will fall within the protection scope of the present invention.

What is claimed is:

1. A speech emotion recognition method based on fused population information, comprising the following steps:

S1: acquiring a user's audio data, expressed as $X_{audio}$, through a recording acquisition device;

S2: preprocessing the acquired audio data $X_{audio}$ to generate a Mel spectrogram feature, expressed as $X_{mel}$;

S3: calculating energy of Mel spectrograms in different time frames for the generated Mel spectrogram feature $X_{mel}$, cutting off a front mute segment and a rear mute segment by setting a threshold to obtain a Mel spectrogram feature, expressed as $X_{input}$, with a length of T;

S4: inputting the Mel spectrogram feature $X_{input}$ obtained in S3 into a population classification network to obtain population depth feature information, expressed as $H_p$;

S5: inputting the Mel spectrogram feature $X_{input}$ obtained in S3 into a Mel spectrogram preprocessing network to obtain Mel spectrogram depth feature information, expressed as $H_m$;

S6: fusing the population depth feature information $H_p$ extracted in S4 with the Mel spectrogram depth feature information $H_m$ extracted in S5 through a channel attention network SENet to obtain a fused feature, expressed as $H_f$; and S7: inputting the fused feature $H_f$ in S6 into the population classification network through a pooling layer to perform emotion recognition;

the population classification network is composed of a three-layer Long Short Term Memory (LSTM) network structure, and the S4 specifically comprises the following steps:

S4_1: first, segmenting the inputted Mel spectrogram feature $X_{input}$ with the length of T into three Mel spectrogram segments $$\frac{T}{2}$$

in equal length in an overlapped manner, wherein the segmentation method is as follows: 0 to $$\frac{T}{2}$$

is segmented as a first segment, $$\frac{T}{4}$$

to $$\frac{3T}{4}$$

is segmented as a second segment, and $$\frac{T}{2}$$

to T is segmented as a third segment; and

S4_2: inputting the three Mel spectrogram segments segmented in S4_1 into the three-layer LSTM network in turn, then taking the last output from the three-layer LSTM network as a final state, obtaining three hidden features for the three Mel spectrogram segments at last, and finally averaging the three hidden features to obtain the final population feature information $H_p$.

2. The speech emotion recognition method based on fused population information of claim 1, wherein the Mel spectrogram preprocessing network in the S5 is composed of a ResNet network and a feature map scaling (FMS) network which are cascaded, and the S5 specifically comprises the following steps:

first, expanding the Mel spectrogram feature $X_{input}$ with the length of T into a 3D matrix;

second, extracting emotion-related information from the Mel spectrogram feature $X_{input}$ by using the ResNet network structure and adopting a two-layer convolution and maximum pooling structure; and third, effectively combining the emotion-related information extracted by the ResNet network through an FMS network architecture to finally obtain the Mel spectrogram depth feature information $H_m$.

3. The speech emotion recognition method based on fused population information of claim 1, wherein the S6 specifically comprises the following steps:

S6_1: the population depth feature information $H_p$ is a 1D vector in space $R^C$, where C represents a channel dimension; the Mel spectrogram depth feature information $H_m$ is a 3D matrix in space $R^{T \times W \times C}$, where T represents a time dimension, W represents a width dimension, and C represents the channel dimension; performing global average pooling on the Mel spectrogram depth feature information $H_m$ in the time dimension T and the width dimension W through the SENet network, and converting the Mel spectrogram depth feature information $H_m$ into a C-dimensional vector to obtain a 1D vector $H_{p\_avg}$ in the space $R^C$; wherein $$H_m = [H^1, H^2, H^3, \ldots, H^C]$$

where, $$H_c = [[h_{1,1}^c, h_{2,1}^c, h_{3,1}^c \quad \cdots \quad ,h_{T,1}^c]^T, [h_{1,2}^c, h_{2,2}^c, h_{3,2}^c \quad \cdots \quad ,h_{T,2}^c]^T, \cdots, [h_{1,W}^c, h_{2,W}^c, h_{3,W}^c \ldots ,h_{T,W}^c]^T]$$

in addition, $$H_{p\_avg} = [h_{p\_avg}^1, h_{p\_avg}^2, h_{p\_avg}^3, \ldots, h_{p\_avg}^C]$$

a formula of the global average pooling is as follows:

$$h^c_{p\_avq} = \frac{1}{TW} \sum_{i=1,j=1}^{T,W} h^c_{ij}$$

S6_2: splicing the 1D vector $H_{p\_avg}$ obtained in S6_1 with the population depth feature information $H_p$ to obtain a spliced feature, expressed as $H_c$, wherein $$H_c = \lfloor H_{p\_avg}, H_p \rfloor$$

S6_3: inputting the spliced feature $H_c$ obtained in S6_2 into a two-layer fully-connected network to obtain a channel weight vector $W_c$, where a calculation formula of the two-layer fully-connected network is as follows:

$$Y = W*X + b$$

where Y represents an output of the two-layer fully-connected network, X represents an input of the two-layer fully-connected network, W represents a weighting parameter of the two-layer fully-connected network, and b represents a bias parameter of the two-layer fully-connected network; and S6_4: multiplying the channel weight vector $W_c$ obtained in S6_3 by the Mel spectrogram depth feature information $H_m$ obtained in S5 to obtain an emotion feature matrix, and performing global average pooling on the emotion feature matrix in a dimension of T×W to obtain a fused feature, expressed as $H_f$.

4. The speech emotion recognition method based on fused population information of claim 1, wherein the S7 specifically comprises the following steps:

S7_1: after passing through the pooling layer, inputting the fused feature $H_f$ obtained in S6 into the two-layer fully-connected network to obtain a 7-dimensional feature vector $H_b$, where 7 represents a number of all emotion categories; and S7_2: taking the 7-dimensional feature vector $H_b = [h_b^1, h_b^2, h_b^3, h_b^4, h_b^5, h_b^6, h_b^7]$ obtained in S7_1 as an independent variable of a Softmax operator, calculating a final value of Softmax as a probability value of an inputted audio belonging to each emotion category, and finally selecting the category with the maximum probability value as a final audio emotion category, wherein a calculation formula of Softmax is as follows:

$$p^i = \frac{e^{h_b^i}}{\sum_{n=1}^{7} e^{h_b^n}}$$

where e is a constant.

* * * * *